(12) United States Patent
Mallicote

(10) Patent No.: US 11,628,787 B2
(45) Date of Patent: Apr. 18, 2023

(54) BUMPER WITH GRILL GUARD

(71) Applicant: Bodyguard Products LLC, Paris, TX (US)

(72) Inventor: Charles Grant Mallicote, Summer, TX (US)

(73) Assignee: BODYGUARD PRODUCTS LLC, Paris, TX (US)

(*) Notice: Subject to any disclaimer, the term of this patent is extended or adjusted under 35 U.S.C. 154(b) by 242 days.

(21) Appl. No.: 17/088,292

(22) Filed: Nov. 3, 2020

(65) Prior Publication Data
US 2021/0129782 A1 May 6, 2021

Related U.S. Application Data

(60) Provisional application No. 62/930,495, filed on Nov. 4, 2019.

(51) Int. Cl.
*B60R 19/48* (2006.01)
*B60R 19/52* (2006.01)
*B60R 11/04* (2006.01)
*B60R 11/00* (2006.01)

(52) U.S. Cl.
CPC ............ *B60R 19/483* (2013.01); *B60R 11/04* (2013.01); *B60R 19/52* (2013.01); *B60R 2011/004* (2013.01); *B60R 2011/0047* (2013.01); *B60R 2011/0084* (2013.01)

(58) Field of Classification Search
CPC ....... B60R 19/483; B60R 11/04; B60R 19/52; B60R 2011/004; B60R 2011/0047; B60R 2011/0084

USPC .......................................................... 293/115
See application file for complete search history.

(56) References Cited

U.S. PATENT DOCUMENTS

| | | | | |
|---|---|---|---|---|
| 7,967,371 | B2* | 6/2011 | Khanna | 348/148 |
| 9,707,916 | B2* | 7/2017 | Mohacsi | B60R 19/52 |
| 10,308,200 | B2* | 6/2019 | Ghannam | B60R 19/26 |
| 10,875,481 | B2* | 12/2020 | Kishi | B60R 19/04 |
| 2002/0125383 | A1* | 9/2002 | Takahashi | B60R 19/483 180/274 |
| 2011/0006553 | A1* | 1/2011 | Fretz | B60R 19/48 296/1.07 |
| 2017/0088076 | A1* | 3/2017 | Fujimoto | B60R 19/12 |
| 2021/0163069 | A1* | 6/2021 | Williams | B62D 21/15 |

FOREIGN PATENT DOCUMENTS

| | | | | |
|---|---|---|---|---|
| JP | 2018103812 | A * | 7/2018 | |
| JP | 6942727 | B2 * | 9/2021 | B60R 1/00 |
| WO | WO-2018105245 | A1 * | 6/2018 | B60R 1/00 |

* cited by examiner

*Primary Examiner* — Pinel E Romain
(74) *Attorney, Agent, or Firm* — Knobbe, Martens, Olson & Bear LLP

(57) ABSTRACT

A front bumper assembly including a vehicle camera relocation mount disposed within a front wall in a manner that leaves no visible sign of a mounting bracket configuration for the vehicle camera. Another front bumper assembly includes a central opening with a removable metal grill insert. The removable metal grill insert configured to connected with the front bumper in a manner that leaves no visible sign of its mounting configuration.

18 Claims, 9 Drawing Sheets

BUMPER WITH GRILL GUARD

CROSS REFERENCE

This application claims the benefit of U.S. Patent Application No. 62/930,495, filed Nov. 4, 2019, the entirety of which is hereby incorporated by reference.

BACKGROUND

Field

The disclosure generally relates to vehicle components. In particular, the disclosure relates to a front vehicle bumper.

Description of the Related Art

Many vehicles are manufactured having stock or OEM bumpers. Such vehicles can also include one or more cameras, which can be used for various purposes, such as driver assist or autonomous driving features. Some vehicle owners seek to replace the stock bumper with an aftermarket replacement bumper that is better suited for certain uses of the vehicle and/or provides a different appearance than the OEM bumper. Some such aftermarket bumpers include grill guards. Such bumpers can cause issues with and/or require relocation of a front-facing vehicle camera.

SUMMARY

According to a first aspect, a bumper assembly for a vehicle includes a bumper portion configured to be attached to the front of the vehicle and a grill guard portion extending upwardly from the bumper portion. A camera opening is disposed in the front wall. A vehicle camera relocation mount aligns with the camera opening.

According to other aspects, the vehicle camera relocation mount includes a forward bracket and a rearward bracket. The forward bracket is spaced from the rearward bracket and configured to receive a mount portion of the vehicle camera therebetween. The forward bracket includes a first leg, a second leg and a connecting leg forming a U-shape, the first leg coupled with the front wall on a first side of the camera opening and the second leg coupled with the front wall on a second side of the camera opening, and the connecting leg includes a central aperture configured to receive the vehicle camera. The front wall includes a first recess and the first leg includes a first projection, the first projection disposed within the first recess to support the forward bracket. The rearward bracket includes an upper leg and a lower leg, the lower leg coupled with a horizontal member at a location spaced rearwardly from the front wall. The upper leg includes a forked portion aligned with the central aperture of the forward bracket. The connection of the forward bracket with the front wall is not visible after a finish is applied to the front wall. The connection of the forward bracket with the front wall is not visible after a finish is applied to the front wall. The vehicle camera relocation mount is on the bumper portion. The vehicle camera relocation mount is on the grill guard portion. The vehicle camera is configured to be flush with the front wall.

According to a second aspect, a bumper assembly for a vehicle includes a bumper portion configured to be attached to the front of the vehicle and a grill guard portion extending upwardly from the bumper portion and defining a central opening. An insert is configured to be removably disposed within the opening and held in place by a connection structure. The connection structure includes no visible connection component in a front wall of the grill guard portion with the insert either disposed within the opening or removed from within the opening.

According to other aspects, there is no visible connection component in a front wall of the grill guard portion includes no welds, holes or bolt heads. The connection structure includes an internal reinforcement structure disposed in the grill guard portion and extending along a first side of the central opening and a first side of the insert includes a plurality of projections configured to be inserted between the internal reinforcement structure and the front wall. The first side of the central opening and the first side of the insert is an upper side. The internal reinforcement structure extends between the front wall and a horizontal wall connected with the front wall. The connection structure includes a first side of the insert includes a flange configured to be mechanically connected with a horizontal wall connected with the front wall, the horizontal wall extending rearwardly from the front wall. The first side of the insert is a lower side. The insert comprises a metal mesh.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
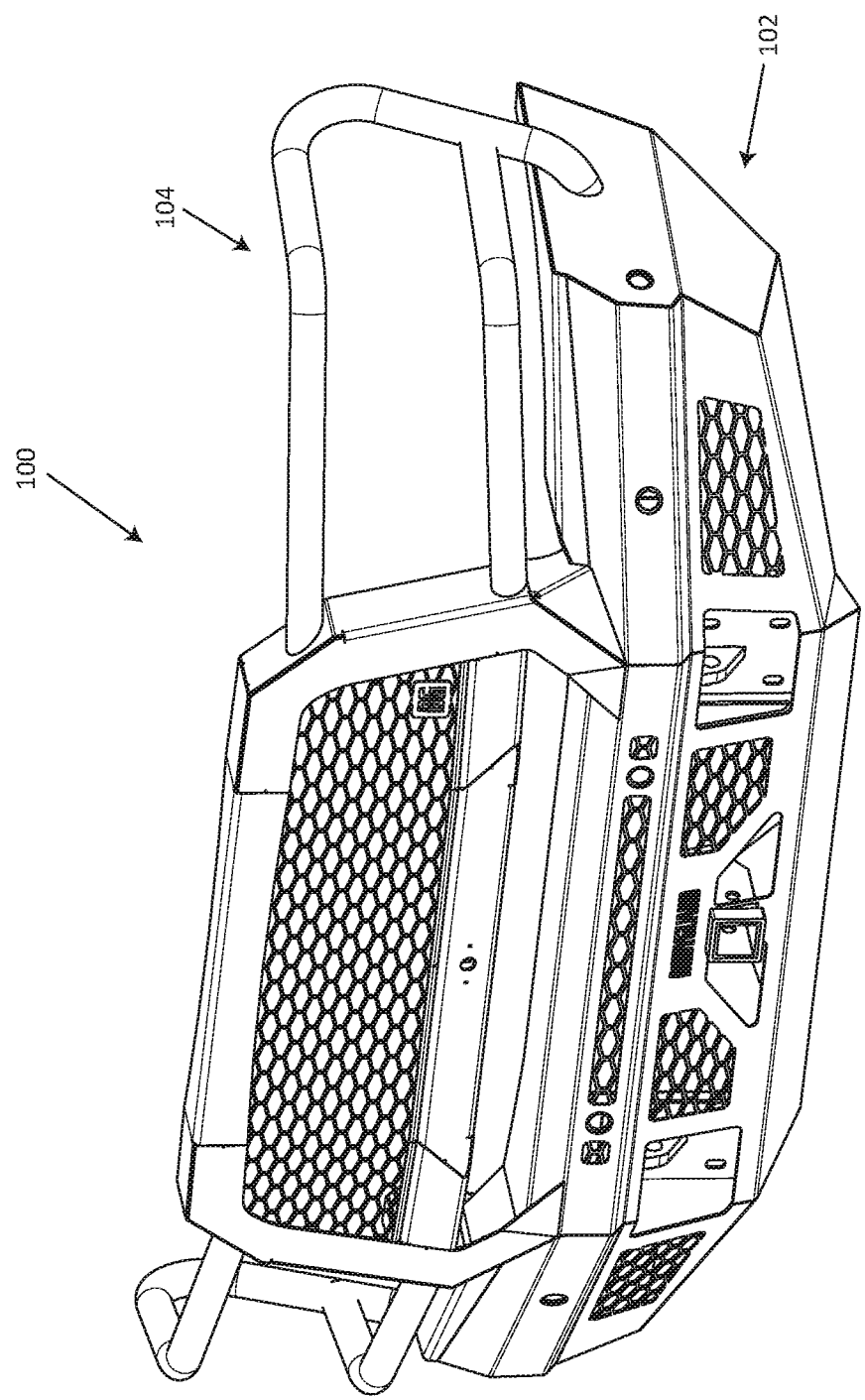
FIG. 1 is a front perspective view of a bumper having a grill guard.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIGS. 1 through 8 illustrate a bumper assembly 100 for a vehicle, such as a light-duty or pickup truck. The bumper assembly 100 can be an aftermarket replacement bumper for a vehicle. However, in other configurations, the bumper assembly 100 could be an OEM bumper for a vehicle. The illustrated bumper assembly 100 includes a bumper portion 102 and a grill guard 104 portion. The grill guard 104 extends above the bumper portion 102 and is configured to be located in front of the vehicle grill in use. The bumper assembly 100 (bumper portion 102 and the grill guard 104) can be constructed of a metal material, such as steel. The bumper assembly 100 can be constructed as an assembly of metal plates, tubing or a combination thereof.

Figure 2:
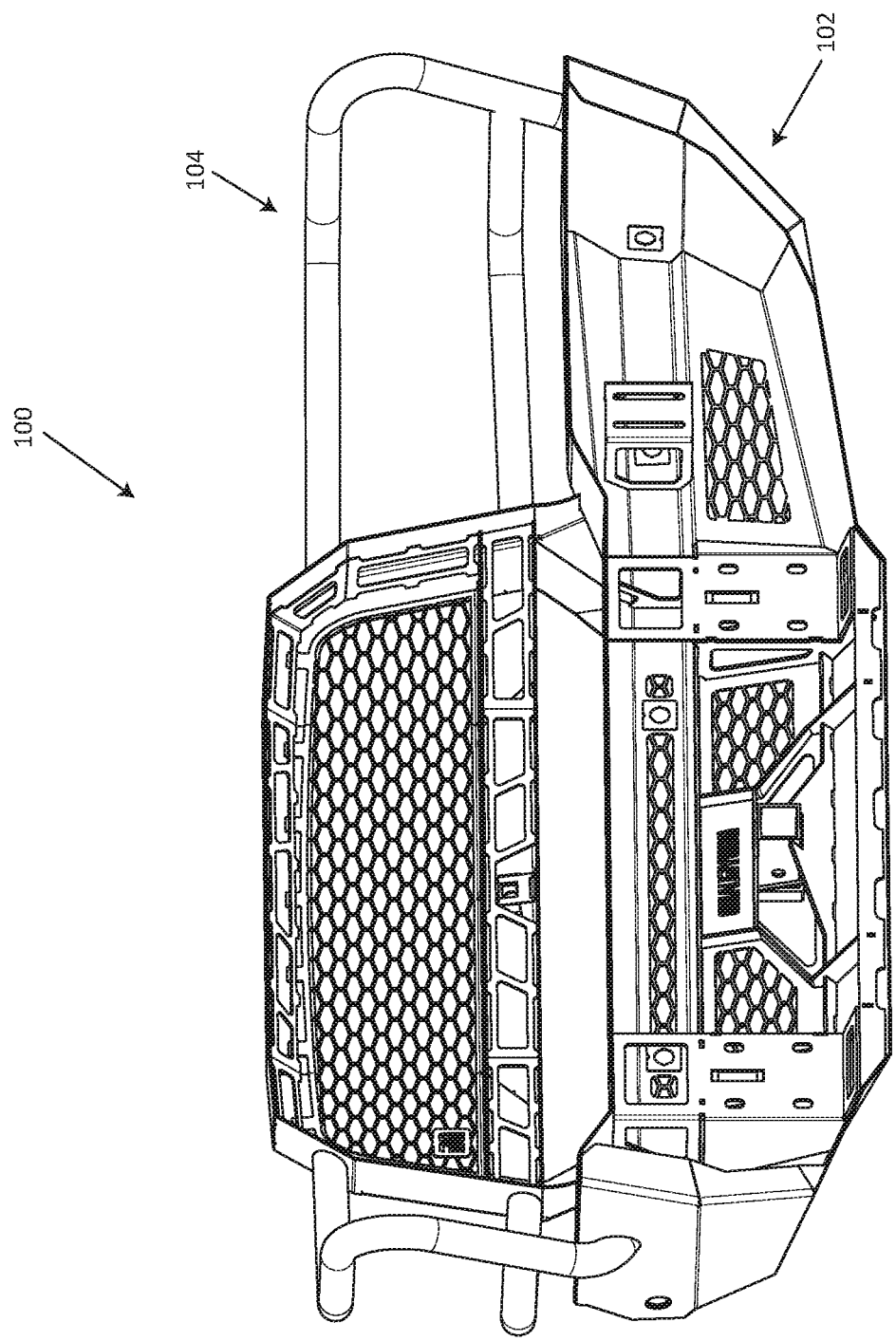
FIG. 2 is a rear perspective view of the bumper with grill guard of FIG. 1.
Figure 9:
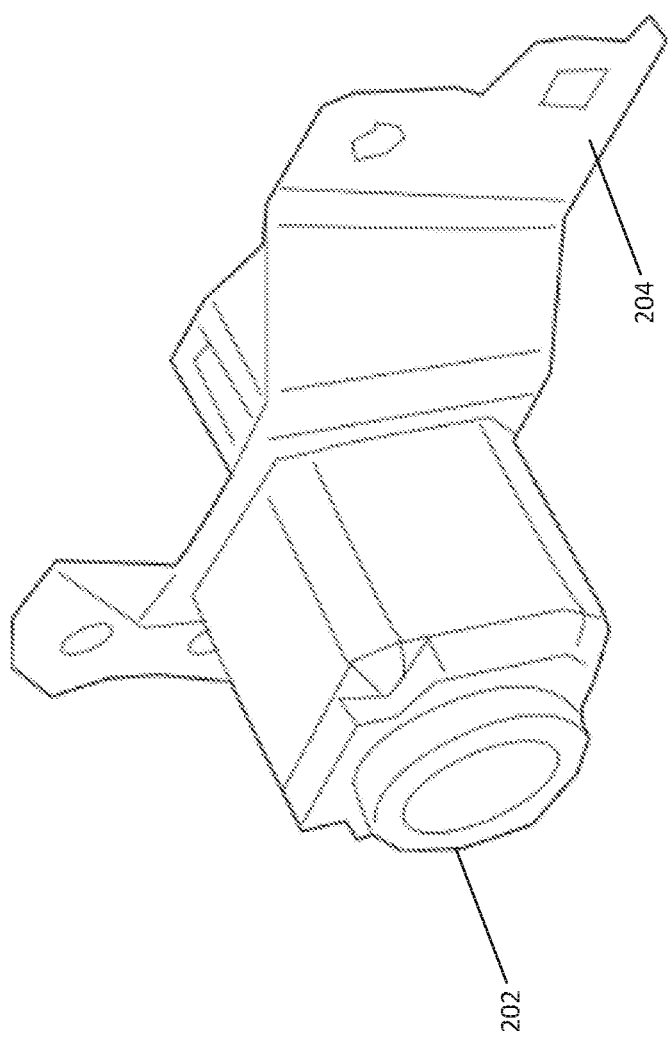
FIG. 9 shows an exemplary front bumper camera with mounting flanges.

The bumper assembly 100 includes a vehicle camera relocation mount 110. In the illustrated arrangement, the vehicle camera relocation mount 110 is located on the grill guard 104. However, in other arrangements, the vehicle camera relocation mount 110 could be located on the bumper portion 102. FIG. 2 illustrates the vehicle camera relocation mount 110 located on an interior side of the grill guard 104. The relocation mount 110 can be located on a lower horizontal member of the grill guard 104. The relocation mount 110 can position the vehicle camera flush with the front wall (e.g., a front surface thereof). Furthermore, although the relocation mount 110 is shown on a front bumper, in other embodiments the relocation mount 110 can be located on a rear bumper or another structure or location of a vehicle at which a camera is provided or desired to be provided. The vehicle camera relocation mount 110 can mount a vehicle camera 202, as shown in FIG. 9. The camera 202 can include a mounting flange 204 configured to mount on the vehicle camera relocation mount 110 (e.g., using one or more mechanical fasteners).

Figure 3:
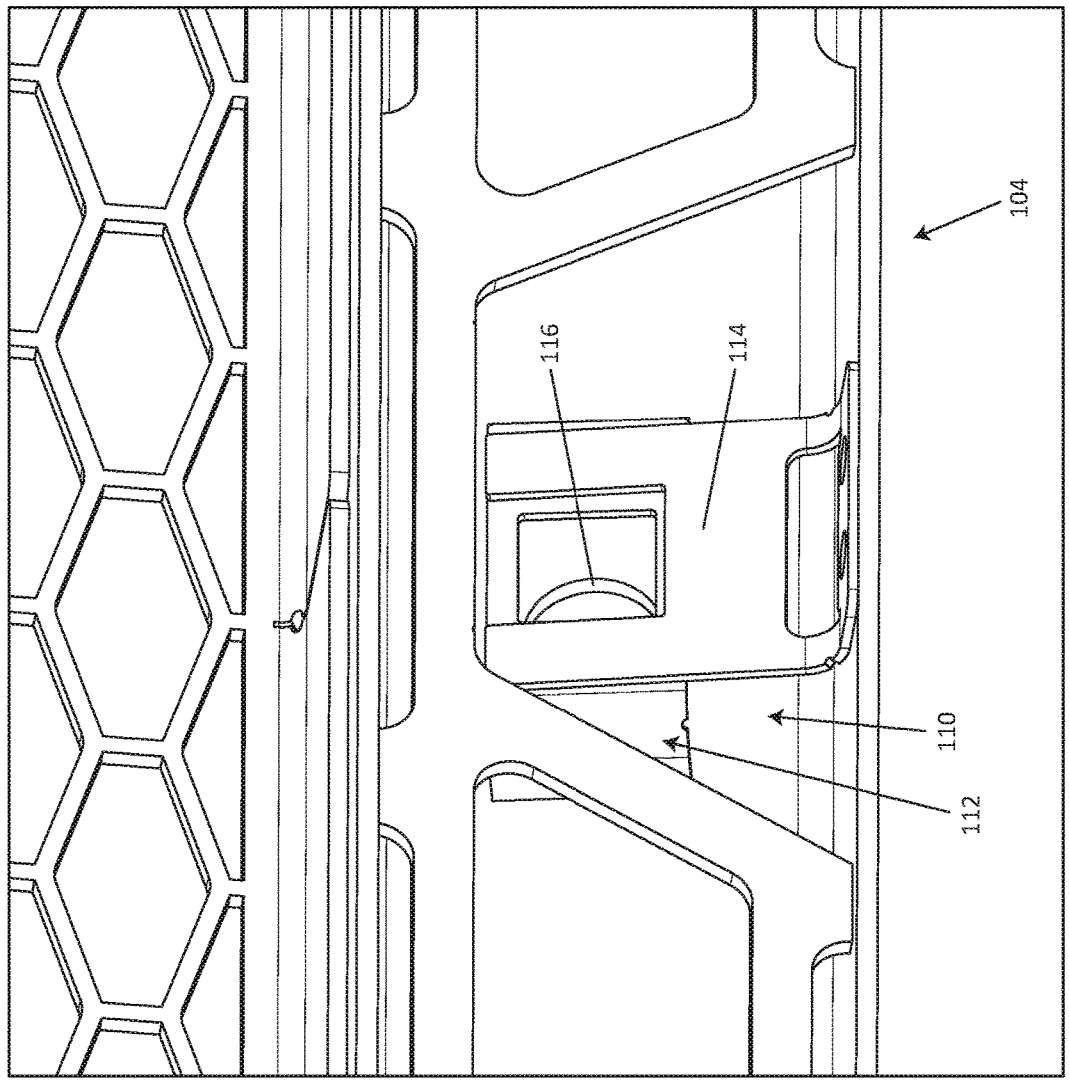
FIG. 3 is a rear perspective view of a portion of the bumper with grill guard showing a camera relocation mount.
Figure 4:
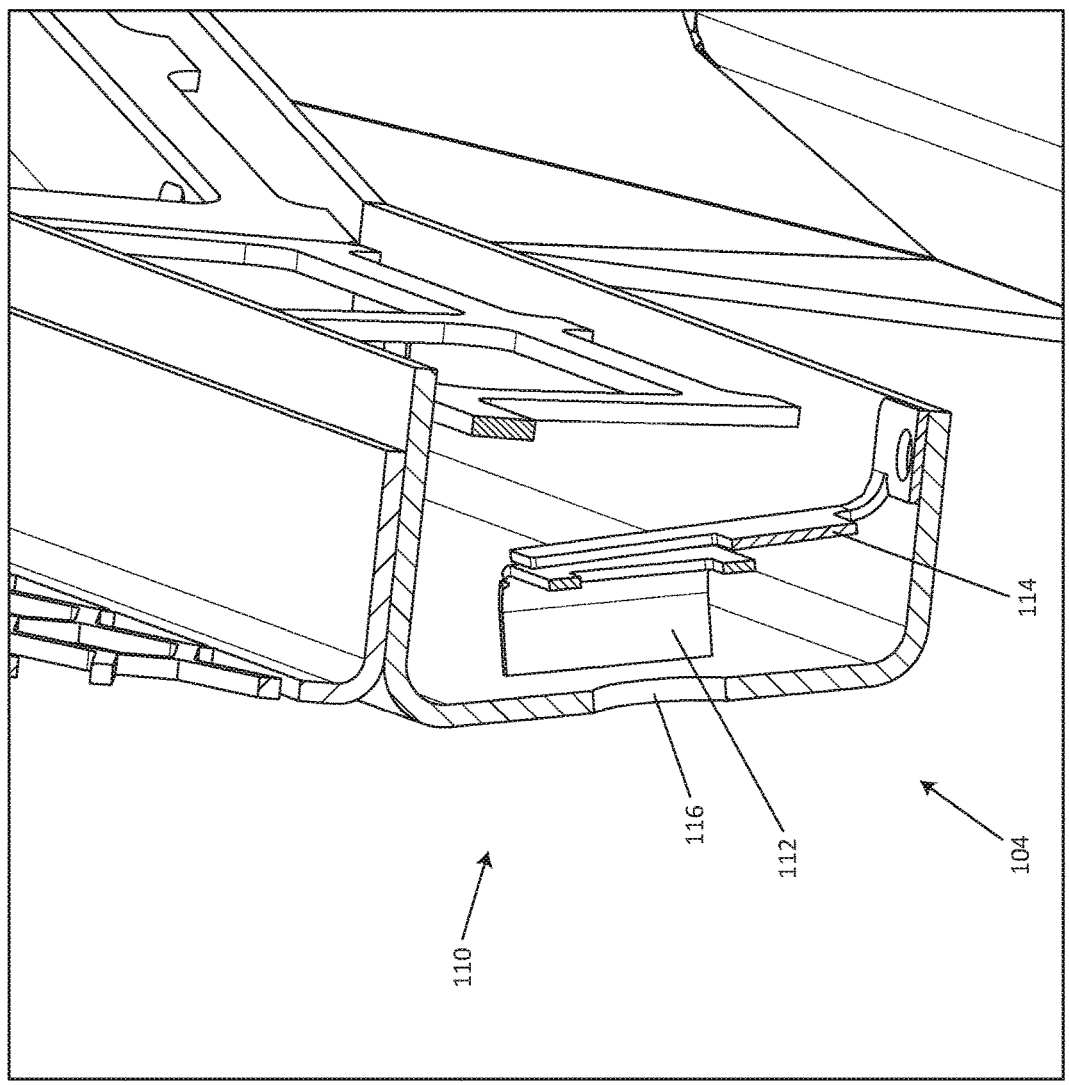
FIG. 4 is a sectional view of the camera relocation mount of FIG. 3 taken along a vertical, central plane extending in a lengthwise direction of the bumper or the vehicle to which the bumper is attached.
Figure 5:
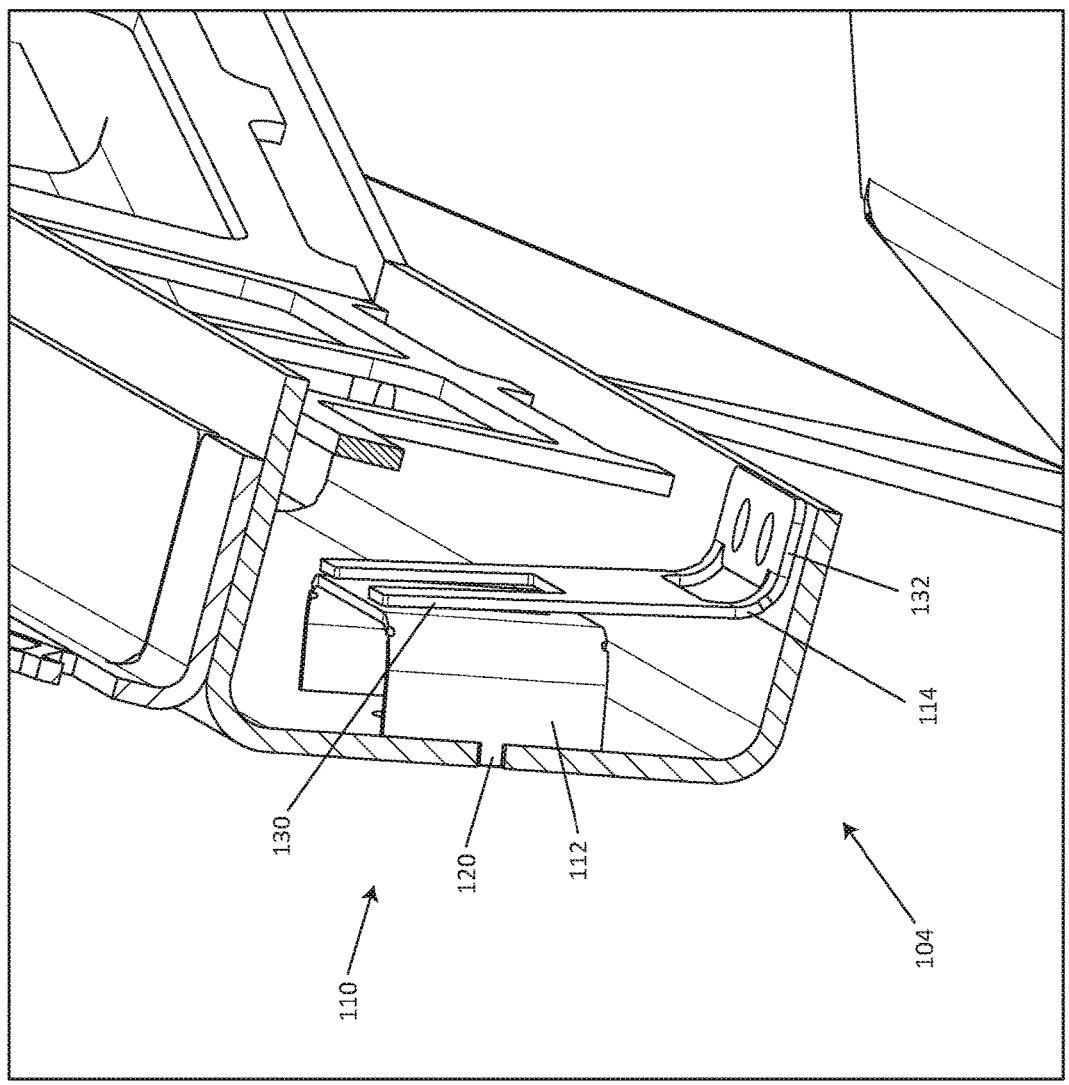
FIG. 5 is another sectional view of the camera relocation mount showing a connection between the camera relocation mount and a portion of the grill guard.

With reference to FIGS. 3-5, the illustrated vehicle camera relocation mount 110 includes a first or forward bracket 112 and a second or rearward bracket 114. The brackets 112, 114 are configured to receive a mount portion of the vehicle camera in a narrow space defined between them. The brackets 112, 114 are configured to position the vehicle camera in alignment with or within an opening 116 of the grill guard 104.

The forward bracket 112 can be U-shaped when viewed from above. With reference to FIG. 5, each end of the U-shaped bracket 112 can include a projection 120 that extends into a cooperating recess of the grill guard 104. The projection 120 and recess can form a mechanical interconnection between the U-shaped bracket 112 and the grill guard 104, which can form the only connection between the bracket 112 and the grill guard 104 or can form a portion of the connection therebetween. For example, the bracket 112 and the grill guard 104 can be further connected via an adhesive or welded connection, for example. Such an arrangement minimizes or eliminates any visual indication of the connection between the bracket 112 and the grill guard 104 from a front side of the grill guard 104. For example, the projections 120 may not be visible from the front side of the grill guard 104 once a finish (e.g., coating) is applied to the bumper assembly 100 or grill guard 104.

The rear bracket 114 can be L-shaped when viewed from the side. A first leg 130 of the L-shaped bracket 114 can extend in a vertical direction and/or parallel to a center portion of the U-shaped bracket 112. The upper end of the first leg 130 can have or form a forked shape. A second leg 132 of the L-shaped bracket 114 is configured to connect the bracket 114 to the grill guard 104. The second leg 132 of the L-shaped bracket 114 can include one or more (e.g., two) openings that can permit the bracket 114 to be connected to the grill guard 104, such as via one or more mechanical fasteners. The connection of the second leg 132 with the grill guard 104 is on a lower wall portion of the grill guard 104—or a wall portion that is not a front wall of the grill guard 104. Accordingly, the connection is not visible on a front surface of the grill guard 104.

Figure 6:
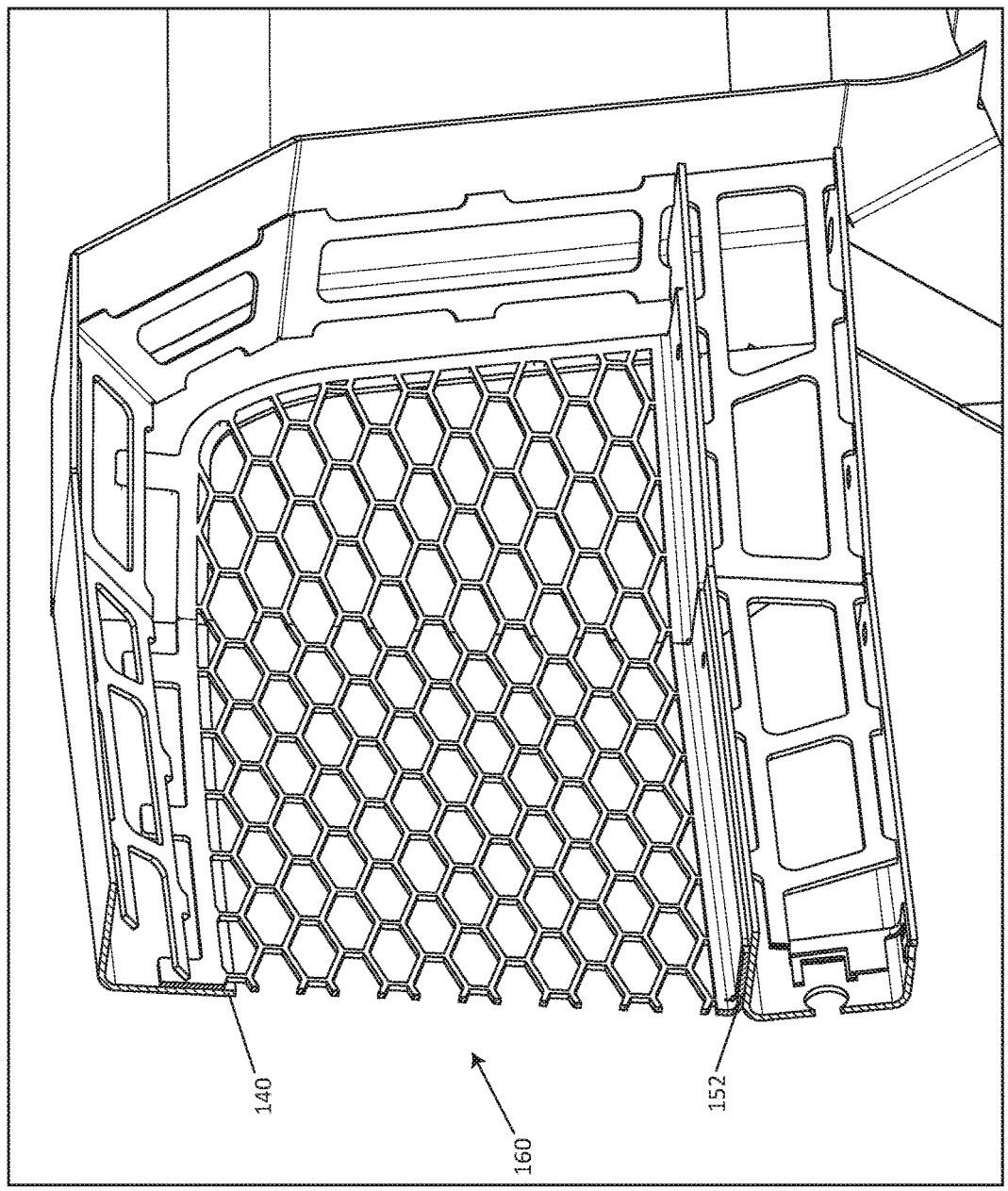
FIG. 6 is a sectional perspective view of the grill guard.
Figure 7:
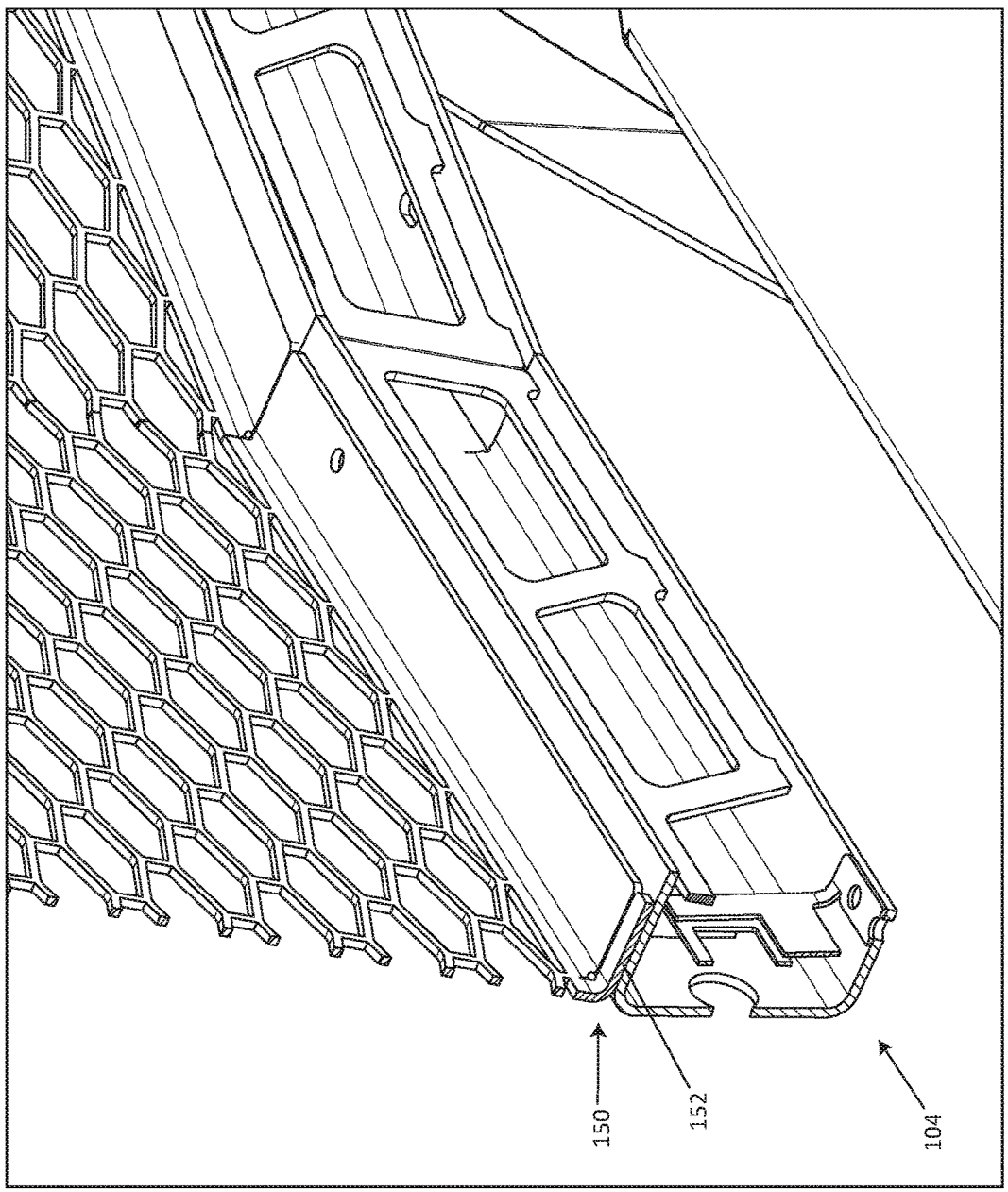
FIG. 7 is a sectional perspective view of a portion of the grill guard.
Figure 8:
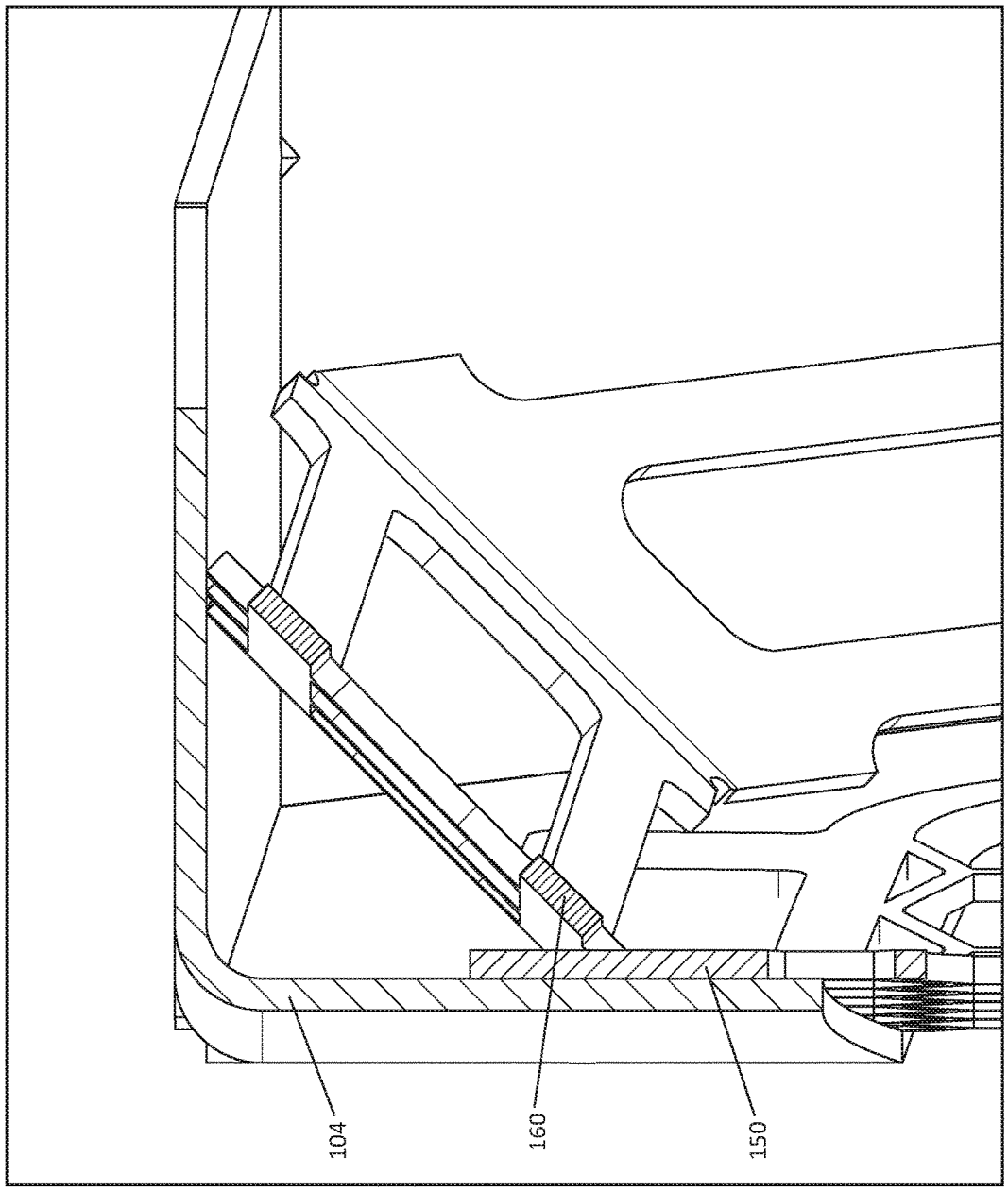
FIG. 8 is a sectional view illustrating a mounting or retention arrangement for an insert of the grill guard.

With reference to FIGS. 6-8, the grill guard 104 can define an opening 140. An insert 150 can be positioned within the opening 140. The insert 150 can be a metal mesh insert. The insert 150 can be planar or non-planar. The insert 150 can be optional. In some configurations, a mounting arrangement for the insert 150 is configured so that a connection between the insert 150 and the grill guard 104 is not visible on a front wall or front surface of the grill guard 104. Accordingly, the insert 150 can be removed leaving no holes, welds, bolt heads, or other connection structures that are visible from the front of the grill guard 104 or on a front wall or front surface of the grill guard 104.

In the illustrated arrangement, the insert 150 can include a leg portion or a flange 152. The flange 152 can be located on a lower edge of the insert 150. The flange 152 can extend rearwardly from a front surface of the insert 150. The flange 152 can include a plurality of openings that permit connection of the insert 150 to the grill guard 104, such as via mechanical fasteners. The corresponding openings of the grill guard 104 are located on an upper wall portion of the grill guard 104—or a wall portion that is not a front wall of the grill guard 104. Accordingly, the connection is not visible on a front surface of the grill guard 104.

Another edge, such as an upper edge, of the insert 150 can be retained by or engaged with another mount arrangement portion of the grill guard 104. With reference to FIGS. 6 and 8, for example, the grill guard 104 can include an internal reinforcement structure 160. The reinforcement structure 160 can be a gusset or strut that extends between a front wall and an upper wall of the grill guard 104. A space can be defined between the reinforcement structure 160 and the front wall of the grill guard 104, which can receive a portion of the insert 150. For example, the insert 150 can include a plurality of projections that can be received within the space between an interior surface of the grill guard 104 and the reinforcement structure 160. With such an arrangement, the retention or connection arrangement is not visible from the front of the grill guard 104.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The invention claimed is:

1. A front bumper assembly for a vehicle, comprising:
   a bumper portion configured to be attached to a front of the vehicle;
   a grill guard portion extending upwardly from the bumper portion;
   a front wall of the bumper portion or the grill guard portion;
   a camera opening in the front wall; and
   a vehicle camera relocation mount aligned with the camera opening;
   wherein the vehicle camera is configured to be flush with the front wall on an outer surface.

2. The front bumper assembly of claim 1, the vehicle camera relocation mount further comprising an upright bracket;
   wherein the upright bracket is spaced from the front wall and configured to receive a mount portion of the vehicle camera therebetween.

3. A front bumper assembly for a vehicle, comprising:
   a bumper portion configured to be attached to a front of the vehicle;
   a grill guard portion extending upwardly from the bumper portion;
   a front wall of the bumper portion or the grill guard portion;
   a camera opening in the front wall; and
   a vehicle camera relocation mount aligned with the camera opening, the vehicle camera relocation mount further comprising an upright bracket, wherein the upright bracket is spaced from the front wall and configured to receive a mount portion of the vehicle camera therebetween;
   wherein the upright bracket includes a first leg, a second leg and a connecting leg forming a U-shape, the first leg coupled with the front wall on a first side of the camera opening and the second leg coupled with the front wall on a second side of the camera opening, and the connecting leg includes a central aperture configured to receive the vehicle camera.

4. The front bumper assembly of claim 3, wherein the front wall includes a first recess and the first leg includes a first projection, the first projection disposed within the first recess to support the upright bracket.

5. The front bumper assembly of claim 4, wherein the connection of the upright bracket with the front wall is not visible after a finish is applied to the front wall.

6. A front bumper assembly for a vehicle, comprising:
   a bumper portion configured to be attached to a front of the vehicle;
   a grill guard portion extending upwardly from the bumper portion;
   a front wall of the bumper portion or the grill guard portion;
   a camera opening in the front wall;

a vehicle camera relocation mount aligned with the camera opening; and an upright bracket including an upper leg and a lower leg, the lower leg coupled with a horizontal member at a location spaced rearwardly from the front wall.

7. The front bumper assembly of claim 6, wherein the upper leg includes a forked portion aligned with the opening.

8. The front bumper assembly of claim 6, wherein the connection of the upright bracket with the horizontal member is not visible.

9. The front bumper assembly of claim 1, wherein the vehicle camera relocation mount is on the bumper portion.

10. The front bumper assembly of claim 1, wherein the vehicle camera relocation mount is on the grill guard portion.

11. A front bumper assembly for a vehicle, comprising:

a bumper portion configured to be attached to a front of the vehicle;

a grill guard portion extending upwardly from the bumper portion and defining a central opening; and an insert configured to be removably disposed within the opening and held in place by a connection structure;

wherein the connection structure includes no visible connection component in a front wall of the grill guard portion with the insert either disposed within the opening or removed from within the opening.

12. The front bumper assembly of claim 11, wherein no visible connection component in a front wall of the grill guard portion includes no welds, holes or bolt heads.

13. The front bumper assembly of claim 11, wherein the connection structure includes:

an internal reinforcement structure disposed in the grill guard portion and extending along a first side of the central opening; and a first side of the insert includes a plurality of projections configured to be inserted between the internal reinforcement structure and the front wall.

14. The front bumper assembly of claim 13, wherein the first side of the central opening and the first side of the insert is an upper side.

15. The front bumper assembly of claim 13, wherein the internal reinforcement structure extends between the front wall and a horizontal wall connected with the front wall.

16. The front bumper assembly of claim 11, wherein the connection structure includes:

a first side of the insert includes a flange configured to be mechanically connected with a horizontal wall connected with the front wall, the horizontal wall extending rearwardly from the front wall.

17. The front bumper assembly of claim 16, wherein the first side of the insert is a lower side.

18. The front bumper assembly of claim 11, wherein the insert comprises a metal grill.

* * * * *